Patented Oct. 1, 1935

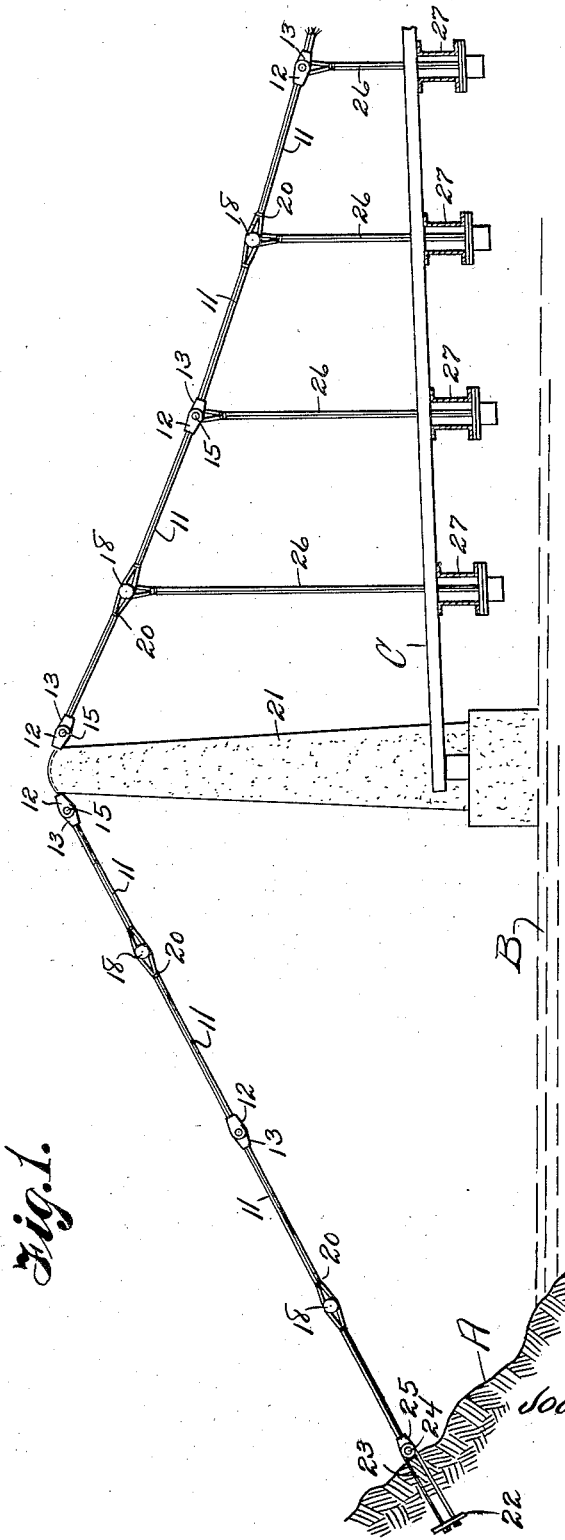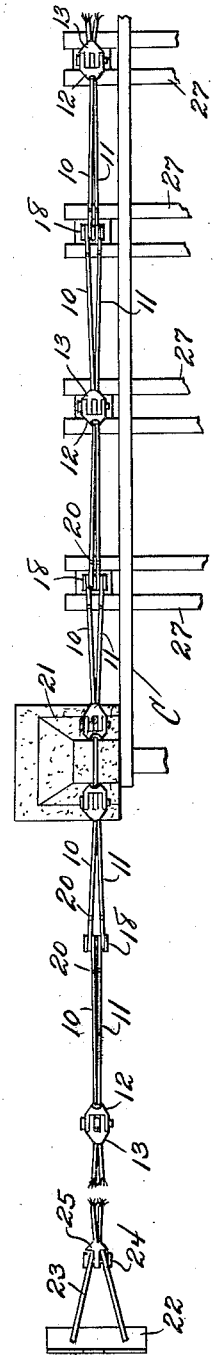

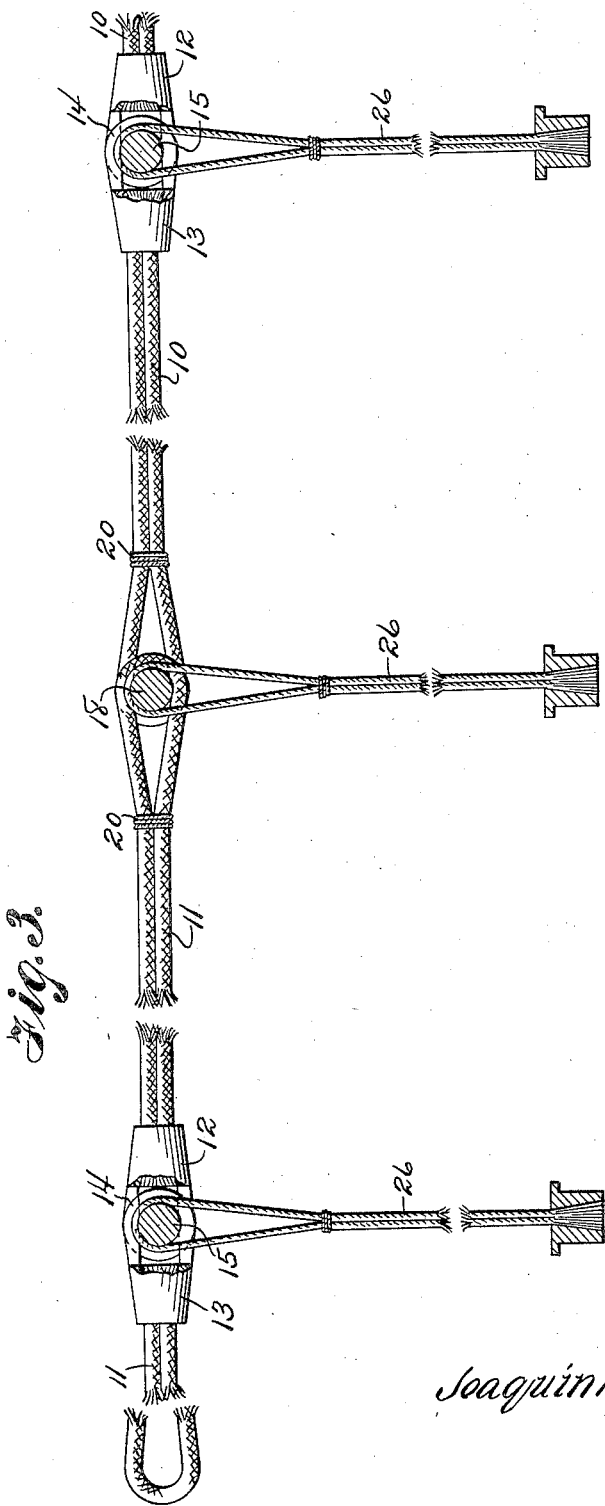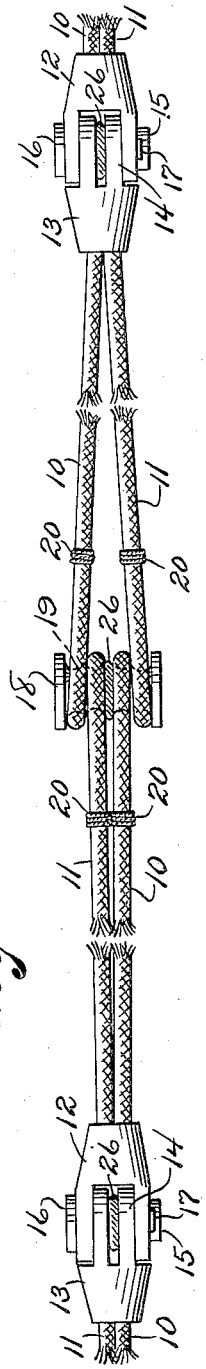

2,016,191

UNITED STATES PATENT OFFICE 2,016,191

SECTIONAL CABLE SUSPENSION ASSEMBLY

Joaquin Pedrero Cordova, Lomas de Chapultepec, D. F. Mexico

Application November 1, 1934, Serial No. 751,061
In Mexico July 30, 1934

3 Claims. (Cl. 14—18)

The invention relates to sectional cable suspension assembly and more especially to sectional cable fittings for suspension or hanging bridges and being improvements over the subject matter of an application for United States Letters Patent filed July 2, 1934, Serial No. 733,508.

The primary aim of the present invention is the provision of an assembly of this character, wherein the cables and pendulums for the erection of suspension or hanging bridges are in the form of sectional cables which, at their ends, are connected with each other in an easy and secure manner and the connecting of the sections of such cables and also the uniting of the pendulums to the cables being novel.

Another object of the invention is the provision of an assembly of this character, wherein the same in its general make-up constitutes an improvement over the subject matter of an application for United States Letters Patent filed July 2, 1934, Serial No. 733,508.

A further object of the invention is the provision of an assembly of this character, which is extremely simple in its make-up, thoroughly reliable and effective for its purposes, strong, durable, and inexpensive in manufacture and installation.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a fragmentary elevation of the sectional cable suspension assembly constructed in accordance with the invention.

Figure 2 is a top plan view thereof.

Figure 3 is a fragmentary longitudinal sectional view through the assembly.

Figure 4 is a top plan view thereof.

Similar reference characters indicate corresponding parts throughout the several views in the drawings.

Referring to the drawings in detail, A designates generally a portion of a bank to a body of water B and above the latter is adapted to be arranged a bridge structure, only a portion C thereof being shown and including a sectional cable suspension assembly constituting the present invention and improvements over the subject matter of the application for United States Letters Patent filed July 2, 1934, Serial No. 733,508, as hereinafter fully described.

The sectional cable suspension assembly embodying the present invention comprises series of oppositely arranged looped cable lengths 10 and 11, respectively, each having its ends made secure in a coupling hereinafter fully described.

Each coupling comprises a pair of oppositely arranged reversely tapered terminal connector links 12 and 13, respectively, these having pivot eyes 14 for receiving a pivot bolt 15 having the head 16 and carrying a cotter pin 17, so that the terminal connector links 12 and 13 may be hinged one to the other and the cotter pin 17 permits the separable connection of the pivot bolt 14 with said connector links. The ends of the cable lengths 10 and 11 in pairs are mortised in the said connector links for firm security thereto.

Intermediate with relation to the terminal connector links 12 and 13 having the cable lengths 10 and 11 mortised therewith are the grooved connectors 18 in the form of cross keys, the grooves 19 of the same accommodating the looped cable lengths 10 and 11 in their pairs between the terminal connectors 12 and 13, so that a linkage is had between these pairs of opposed looped cable lengths.

The stretches of the looped cable lengths 10 and 11 next to the connectors 18 are brought together by binding mediums 20 to close the said lengths trained about the connectors 18 to avoid accidental riding of these cable lengths from the latter on the joining of the same and thus it will be apparent that free flexing action is had between the cable lengths disposed at opposite sides of the connectors 18 and with the same.

At each bank A of a ravine or river course B is firmly installed a vertical upright, post or column 21 over which is bridged the cable assembly, while buried within the foundation or soil of the bank A is an anchoring plate 22 having bolted or otherwise secured thereto an angularly disposed forwardly directed anchor 23 which, in its angular disposition, is extended above the top surface of the bank A for the connection through the medium of a cross pivot 24 with a terminal link 25 corresponding to or of a kind identical with the connector 12 and in this fashion the sectional cable assembly has anchorage with the bank A.

At selected couplings including the terminal connector links 12 and 13 and the connectors 18 are the looped cable pendulums 26 which have fastening with the platform sills or beams 27 for the suspension or hanging bridge C, it being understood, of course, that there may be employed the required number of pendulums 26 for maintenance of the platform of the bridge under the erection thereof. These looped cable pendulums embrace the pivot bolts 15 of the coupling including the connector links 12 and 13 and the connectors 18 and those cable pendulums embracing the pivots 15 are disposed between the eyes 14 of the terminal connector links 12, while those cable pendulums embracing the connectors 18 are intermediate of the connected pairs of cable lengths 10 and 11 with said connectors 18.

It should be apparent from Figures 3 and 4 of the drawings that the looped cable lengths 10 and 11 in pairs are mortised with the respective connector links 12 and 13 of the coupling and are looped about the connectors 18 in the setting of the assembly for the suspension or hanging bridge structure and at the extremities of this assembly each is anchored in the use of the connector link 25 which corresponds to the connector link 13 of the coupling hereinbefore described.

What is claimed is:

1. In an assembly of the character described, the combination of separable pivoted terminal connector links, pairs of looped cable lengths mortised in said links and reversely extending from each other in their pairs, cross keys joining the cable lengths in their pairs at ends adjacent each other, and looped cable pendulums engaged with the pivots of the connector links and said cross keys.

2. In an assembly of the character described, the combination of separable pivoted terminal connector links, pairs of looped cable lengths mortised in said links and reversely extending from each other in their pairs, cross keys joining the cable lengths in their pairs at ends adjacent each other, looped cable pendulums engaged with the pivots of the connector links and said cross keys, and anchoring means for the outermost looped cable lengths.

3. In an assembly of the character described, the combination of separable pivoted terminal connector links, pairs of looped cable lengths mortised in said links and reversely extending from each other in their pairs, cross keys joining the cable lengths in their pairs at ends adjacent each other, looped cable pendulums engaged with the pivots of the connector links and said cross keys, anchoring means for the outermost looped cable lengths, and binding means embracing the stretches of the cable lengths next to the keys for closing said lengths about the latter.

JOAQUIN PEDRERO CORDOVA.